United States Patent [19]
Schimmel

[11] Patent Number: 6,148,379
[45] Date of Patent: Nov. 14, 2000

[54] SYSTEM, METHOD AND COMPUTER PROGRAM PRODUCT FOR PAGE SHARING BETWEEN FAULT-ISOLATED CELLS IN A DISTRIBUTED SHARED MEMORY SYSTEM

[75] Inventor: Curt F. Schimmel, San Ramon, Calif.

[73] Assignee: Silicon Graphics, Inc., Mountain View, Calif.

[21] Appl. No.: 08/933,999

[22] Filed: Sep. 19, 1997

[51] Int. Cl.[7] .................................................. G06F 12/00
[52] U.S. Cl. ......................... 711/152; 711/147; 711/148; 395/680
[58] Field of Search .................................... 711/147, 148, 711/121, 205, 206; 395/680; 707/202; 710/26

[56] References Cited

U.S. PATENT DOCUMENTS

| | | | |
|---|---|---|---|
| 5,247,673 | 9/1993 | Costa et al. | 711/205 |
| 5,303,362 | 4/1994 | Butts, Jr. et al. | 711/121 |
| 5,555,404 | 9/1996 | Torbjornsen et al. | 707/202 |
| 5,592,625 | 1/1997 | Sandberg | 711/147 |
| 5,659,798 | 8/1997 | Blumrich et al. | 710/26 |
| 5,771,383 | 6/1998 | Magee et al. | 395/680 |
| 5,790,426 | 8/1998 | Robinson | 702/179 |
| 5,844,025 | 3/1999 | Baehr et al. | 713/201 |
| 5,864,876 | 1/1999 | Rossum et al. | 711/206 |
| 5,878,240 | 3/1999 | Tomko | 711/148 |

OTHER PUBLICATIONS

Hennessy and Patterson, *Computer Architecture: A Quantitative Approach*, 2nd Ed., pp. 439–457 and 634–760, Morgan and Kaufman Publishing, USA 1996.

Goodheart, B. and James Cox, *The Magic garden Explained*, Prentice Hall, 1994, pp. 69–140.

Schimmel, *UNIX System for Modern Architectures: Symmetric Multiprocessing and Caching for Kernel Programmers*, Addison–Wesley Professional Computing Series, 1994, pp. 5–8.

*Primary Examiner*—Do Hyun Yoo
*Assistant Examiner*—Mehdi Namazi
*Attorney, Agent, or Firm*—Sterne, Kessler, Goldstein & Fox PLLC

[57] ABSTRACT

A system, method and computer program product for sharing memory between fault-isolated cells of a computer system. A page of memory is exported from an exporting cell to an importing cell by selectively opening a hole in a fire-wall that otherwise fault-isolates the exporting cell and the importing cell. The fire-wall opening permits the importing cell to access a specific page of memory in the exporting cell. Access to other memory cells is still prevented by the fire-wall. When a page of memory is exported, a record of the export is generated in the exporting cell. Export records are used to determine whether a requesting cell is permitted to access a requested page of memory and to terminate memory exports in a controlled fashion. When a page of memory is imported, an import record and a proxy page frame data structure are generated in the importing cell. Import records are used to access pages of memory in other cells and to terminate imports in a controlled fashion. Proxy page frame data records are used to maintain fault isolation between cells and to ensure that kernel data is never shared between cells.

43 Claims, 13 Drawing Sheets

SYSTEM, METHOD AND COMPUTER PROGRAM PRODUCT FOR PAGE SHARING BETWEEN FAULT-ISOLATED CELLS IN A DISTRIBUTED SHARED MEMORY SYSTEM

CROSS-REFERENCE TO OTHER APPLICATIONS

This patent application is related to the following commonly owned United States utility application:

"System, Method and Computer Program Product for Reverse Mapping Physical Memory to Referencing Data Structures," by Curt F. Schimmel, Narayanan Ganapathy, Bhanuprakash Subramanya and Luis Stevens, filed concurrently herewith, Attorney Docket No.15-4-472.00 (1452.2380000), incorporated herein by reference in its entirety.

BACKGROUND OF THE INVENTION

1. Field of the Invention

The present invention relates to fault isolated, distributed shared memory, multi-processor systems and environments.

2. Related Art

In distributed shared memory (DSM) systems, physical memory is distributed among a plurality of processing nodes. The distributed memory is addressable as a single block of memory. Generally, processors within any of the processing nodes can access physical memory on any other node.

One problem faced by DSM systems is fault containment. DSM systems can include tens, hundreds and, in some instances, even thousands of processors plus many other components. Larger systems have more components that can fail and, as a result, failures tend to occur more frequently. When a fault occurs in a process, a processing task, a thread, a processor, physical memory or in any other part of a processing node, the node and any other nodes that may have accessed data from the failed node have to be reset. Conventional systems do not track users of data. Thus, a failure in any part of a system can bring the whole system down. It is undesirable to take a whole system down each time there is a failure, especially in larger DSM systems where failures tend to occur more frequently. In order to prevent total system failure every time there is a fault, faults must be isolated.

In order to isolate failures, fire-walls can be constructed between portions, or cells, of the system. A separate kernel runs on each cell. The fire-walls prevent sharing of memory between cells and prevent the separate kernels from sharing data so that failures in one cell do not contaminate other cells.

However, without shared memory, processes or threads that run on different cells must communicate with messages or something similar. Thus, strict fire-walls hurt performance and require SMP applications to be re-written in order to operate on a fault-isolated DSM.

What is needed is a system, method and computer program product for selectively opening holes in fire-walls to allow pages of memory to be shared in a controlled fashion.

SUMMARY OF THE INVENTION

The present invention is a system, method and computer program product for sharing memory between fault-isolated cells of a computer system, such as, for example, distributed shared memory (DSM) systems and other non-uniform memory access systems. The present invention selectively opens holes in fire-walls to allow pages of memory to be shared in a controlled fashion. The present invention can be implemented as an integral part of an operating system that runs on a cell.

In one embodiment, the present invention includes an export module for exporting memory from a cell and an import module for importing memory to the cell. Each cell includes an export module and an import module. The export module receives a request from a remote cell to access data (i.e., to read or write to data) that is stored in a page of memory of the cell. The export module determines whether the remote cell is permitted to access the requested page. If so, the export module exports the requested page. When a page is exported, an importing cell can access the page as if it were part of the importing cell.

A page of memory is exported by selectively opening a portion, or a hole, in a fire-wall that otherwise fault-isolates the exporting cell and the importing cell. The fire-wall opening permits the importing cell to access a specific page of memory in the exporting cell. Access to other memory cells is still prevented by the fire-wall.

When a page of memory is exported, a record of the export is generated in the exporting cell. The export record includes data that identifies the location of exported page of memory and data that identifies the cells to which the page was exported.

Export records are used to terminate memory exports in a controlled fashion. Termination can be caused by a failure in an importing cell, by non-use in the importing cell, by a determination in the exporting cell to use the memory for another purpose or by a decision in an importing cell that the memory is no longer needed.

When there is a failure in an importing cell, other cells search their export records for exports to the failed cell. If a cell exported a page of memory to the failed cell, the export is terminated by removing the corresponding export record and by closing the fire-wall opening between the exporting cell and the failed importing cell.

When an exporting cell determines to use an exported page of memory for another use, the export record for that page is used to identify cells that imported the page. The importing cells are then notified of the impending export termination. Preferably, termination of the export is delayed until confirmation an/or permission from the importing cell or cells is received. This permits importing cells to terminate imports in a controlled fashion. The export is terminated by removing the export record and closing the fire-wall opening.

When an exporting cell receives notification that an importing cell no longer needs an exported page of memory, the export is terminated by removing the export record for the page and by closing the fire-wall opening.

An import of a page of memory is initiated when an importing cell sends requests for data to other cells. When a request is approved by another cell, the requesting, or importing, cell receives data from the exporting cell that identifies the location of the data or the page of memory. The data may include a physical address, a page number, etc.

When a page of memory is imported, an import record is generated in the importing cell. Import records include data that identifies an imported page of memory and data that identifies the cell from which the page was exported. The data that identifies the page location can include a physical address, a page number, etc. Import records can be stored in an import table. Import records are used to terminate imports in a controlled fashion.

When a page of memory is imported, a proxy page frame data structure (PFDAT) is generated in the importing cell. The proxy PFDAT is used by the kernel on the importing cell to represent the imported page of memory. A conventional, or local, PFDAT is maintained for the page by the exporting cell. Thus each cell or kernel maintains its own representation of the page. Proxy PFDATs permit kernels to avoid sharing of data structures between kernels, thus maintaining fault-isolation between kernels.

The proxy PFDAT looks and functions like a regular PFDAT. As a result, most of the operating system need not be aware that a page of memory is an imported page of memory. This permits the present invention to be implemented in a variety of operating systems without rewriting portions that deals with PFDATs.

Proxy PFDATs can be cached in page caches just as conventional, or local, PFDATs are. In one embodiment, a global page cache holds local and proxy PFDATs for a cell. In another embodiment, proxy PFDATs are cached in distributed page caches, where each distributed page cache holds local and proxy PFDATs for an individual memory object (i.e., a page cache is attached to an owning memory object). In yet another embodiment, a global page cache holds local PFDATs and a separate import page cache holds proxy PFDATs. In this embodiment, the import page cache can double as an import table for storing import records.

In one embodiment, when a PFDAT or a proxy PFDAT is associated with a memory object that is not present on the same cell as the PFDAT or proxy PFDAT, a proxy memory object data structure is generated in the importing cell. Proxy memory object data structures look and function as conventional, or local, memory object data structures. The importing cell, or kernel, uses the proxy memory object data structure to represent the owning memory object just as it uses local memory object data structures. Proxy memory object data structures can be associated with distributed page caches.

An import can be terminated when a failure occurs in an exporting cell, when the importing cell no longer needs an imported page and when an exporting cell notifies an importing cell of a pending termination of an export. When a failure occurs in a cell, all other cells search their import records to determine whether any pages of memory were imported from the failed cell. If a cell imported a page of memory from the failed cell, the associated import record and is removed and the associated proxy PFDAT is de-allocated.

When an importing cell no longer needs an imported page of memory, the import module uses the record of the import to identify the cell that exported the page. The exporting cell is notified and the import record is removed. In one embodiment, a proxy page frame data structure that represents the imported page in the importing cell includes a use-indicator. When the use-indicator indicates that the page is not being used, the importing cell terminates the import.

When an exporting cell decides to terminate an export of a page, it notifies all cells that imported the page. When an importing cell receives the notification, the importing cell can terminate the import by removing its record of the import and by de-allocating an associated proxy PFDAT. Preferably, the importing cell can preempt the exporting cell's decision to terminate the export. In one embodiment, proxy PFDATs are provided with reverse map information that identifies data structure references, such as, for example, page table entries, that reference imported pages of memory. When an import is terminated, the reverse map information is used to identify data structure references that reference the imported page of memory. The identified data structure references are then removed along with the record of the import.

For example, when an importing cell stores a virtual memory address-to-physical address translation in page table entry of a page table, and when the page table entry identifies the imported page of memory as the location of a virtual memory page, reverse map information is placed in a proxy page frame data structure that represents the imported page. When the import of the page of memory is terminated, the reverse map information is used to identify the page table entry so that the translation can be invalidated, removed, updated, etc.

One advantage of the present invention is that cells maintain their own data structures for pages, such as PFDATs and proxy PFDATs, their own export and import records, etc. Each cell thus has all the information it needs to clean up on termination of an import or export, whether the termination is prompted by decision in the cell, by a decision in another cell, or by a failure in another cell. As a result, cells can borrow pages of physical memory from other cells while maintaining a generally fault-isolated environment.

Further features and advantages of the present invention, as well as the structure and operation of various embodiments of the present invention, are described in detail below with reference to the accompanying drawings.

BRIEF DESCRIPTION OF THE FIGURES

The present invention will be described with reference to the accompanying figures, wherein.

In the figures, like reference numbers generally indicate identical, functionally similar, and/or structurally similar elements. The figure in which an element first appears is indicated by the leftmost digit(s) in the reference number.

DETAILED DESCRIPTION OF THE PREFERRED EMBODIMENTS

Table of Contents

Figure 1:
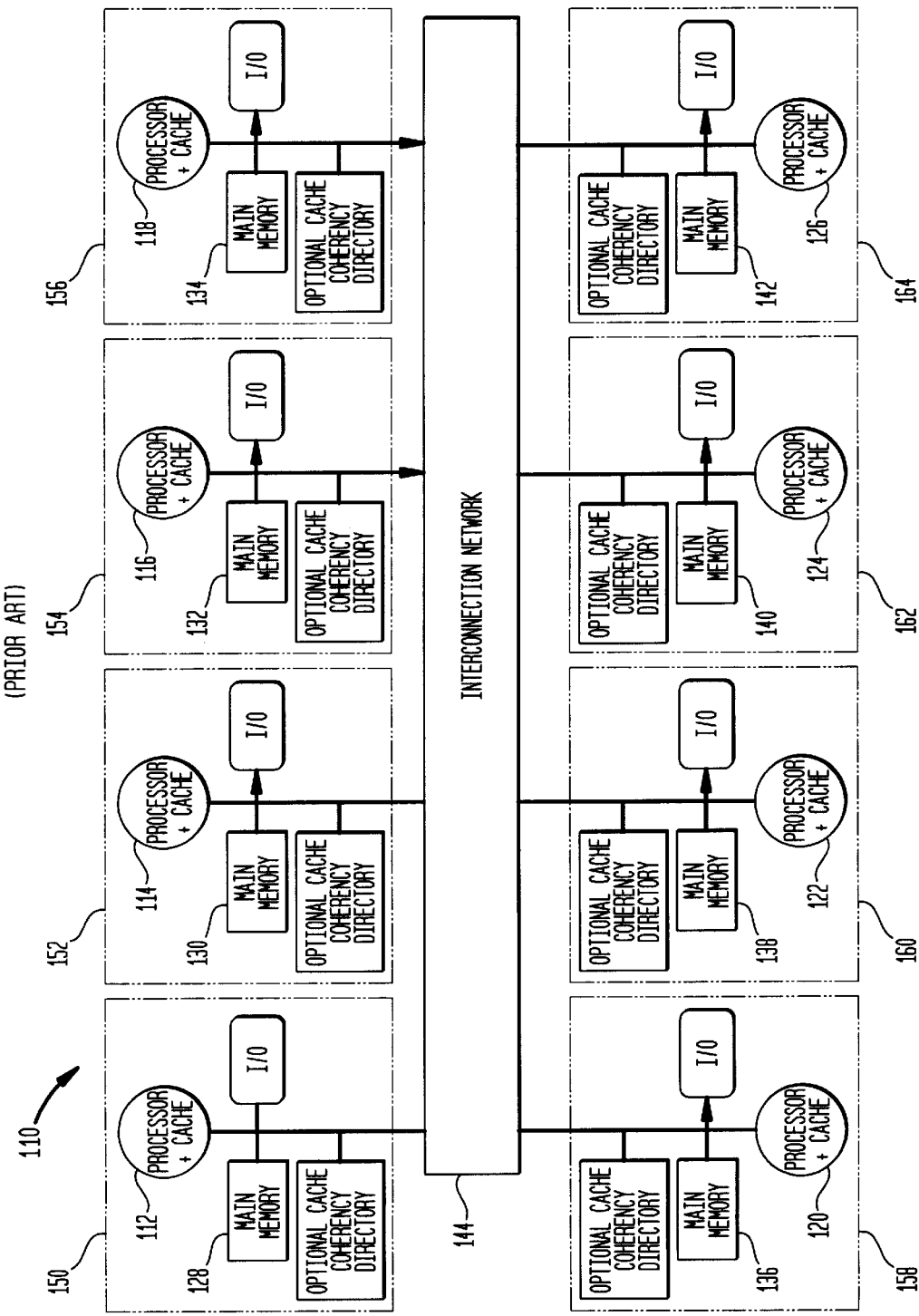
FIG. 1 is a block diagram of a distributed shared memory, multi-processing (DSM) system that can employ the present invention.

I. Overview and Terminology
II. Example Environment
   A. Distributed Shared Memory, Multi-Processing (DSM) Systems
   B. Fault-Isolated DSM System Cells
   C. Data structures for Representing Physical Memory and Memory Objects
   D. Reverse Mapping
III. Inter-Cell Page Sharing
   A. Exporting Memory
   B. Importing Memory
IV. Conclusion

I. Overview and Terminology

The present invention is a system, method and computer program product for inter-cell page sharing in a fault isolated, distributed shared memory (DSM) system. Fault-isolated DSM systems are divided into fault-isolated cells through the use of fire-walls. The present invention permits sharing of physical memory between fault-isolated cells by selectively opening and closing fire-walls in a controlled fashion.

When a processing node in a first cell requests access to a page of physical memory that is located in a second cell, a decision is made as to whether the first cell is to be granted access to the requested page of physical memory. If the request is granted, the first cell can access the requested page of physical memory. The first cell, or requesting cell, can share access to the requested page of physical memory with the second cell, or the exporting cell, and with other cells. Alternatively, the requesting cell can be granted exclusive access rights.

In either case, the page of physical memory is said to be exported from the second cell and imported by the first cell. The requested page of physical memory can thus be referred to as an exported page of memory when the context is the exporting cell and as an imported page of memory when the context is the importing cell.

Throughout this specification reference is made to pages of physical memory. Wherever a page of physical memory is referred to, it is to be understood that any unit of physical memory is intended, including, but not limited to, page, segment, block and individual memory cells.

Conventional operating systems generate data structures to represent pages of physical memory. These data structures can be implemented in a variety of ways and referred to by a variety of names. For example, in Silicon Graphics' IRIX operating system, these data structures are referred to as page frame data structures, or PFDATs. A PFDAT contains identification and state information for its associated page frame.

Throughout the remainder of this specification, the terms page frame data structure and PFDAT are used interchangeably to refer to data structures that represent pages of physical memory. Whenever a page frame data structure or a PFDAT is referred to, it is to be understood that it is used in a broad sense to refer to any data structure that is employed to represent a page of physical memory.

Conventional operating systems generate data structures to represent memory objects and to store state information for memory objects. These memory objects can include regular files as well as anonymous memory objects such as, for example, stacks, heaps, UNIX System V shared memory and /dev/zero mappings. A memory object can be backed by a disk file and, hence, can be larger than physical memory. The operating system manages which portion of the memory object occupies memory at any given time.

Data structures that represent memory objects can be implemented in a variety of ways and referred to by a variety of names. In Silicon Graphics' IRIX operating system, for example, regular files are represented by VNODE data structures. Throughout the remainder of this specification, the term memory object data structure is used to refer to data structures that represent memory objects. Wherever the term memory object data structure is used, it is used in a broad sense to refer to any data structure that represents a memory object.

When a page of memory stores a page of a memory object, the PFDAT that represents the page of memory generally includes a pointer to the memory object or to a data structure that represents the memory object. Where memory is divided into pages, the operating system needs to know which portion of a memory object is contained in a page of memory. Thus, the PFDAT generally includes a logical offset, as well. The logical offset identifies a portion of the memory object, relative to the beginning of the memory object.

II. Example Environment

The present invention can be implemented in a variety of computer systems and environments, including, but not limited to, distributed shared memory (DSM) multi-processor systems. The present invention can be implemented in software, firmware or a combination software, firmware and/or hardware. For example, the present invention can be implemented in an IRIX™ or Cellular IRIX™ operating system executed by an Origin™ scalable, distributed shared-memory multi-processor platform, manufactured by Silicon Graphics, Inc., Mountain View, Calif. The examples herein are provided to assist in the description of the present invention, not to limit it.

A. Distributed Shared Memory, Multi-Processing (DSM) Systems

Referring to FIG. 1, a distributed shared memory (DSM) system 110 includes a number of processing nodes 150–164, interconnected via an interconnection network 144. DSM system 110 can include any number of processing nodes 150–164. Each processing node 150–164 is illustrated with a processor and cache node 112–126 and a portion of distributed shared memory 128–142. Each processor and cache node 112–126 can include one or more processors and each processor can be coupled to shared memory 128–142 through one or more levels of cache. As would be apparent to a person skilled in the art, one or more of processing nodes 150–164 need not employ a processor and cache node.

Distributed shared memory portions 128–142 are accessed by the processors within processing nodes 150–164 as if shared memory portions 128–142 formed a single continuous block of physical memory. As would be apparent to a person skilled in the art, one or more of processing nodes 150–164 need not employ a portion of shared memory.

By distributing physical or main memory 128–142 throughout DSM system 110, a plurality of processing node 150–164 can include a portion of main memory. Physical proximity between processor and memory reduces memory latency with respect to the processor and memory within a processing node.

DSM system 110 is preferably configured so that data which is accessed most frequently by a particular processing node is placed in the portion of main memory within the processing node. If that data is subsequently accessed more frequently by a processor in another processing node, the data is migrated, or moved, to a portion of main memory within the other processing node.

Each processing node 150–164 is shown with an optional input/output (I/O) device. As would be apparent to a person skilled in the art, one or more of processing nodes 150–164 need not have an I/O device. Moreover, different types of I/O devices and combinations of external peripherals and resources can be used in a DSM system. Thus, one or more of processing nodes 150–164 can include any combination of processors or no processors, shared memory or no shared memory and I/O or no I/O.

Each processing node 150–164 is shown with an optional cache coherency directory. However, the present invention is not limited to directory-based cache coherency protocols. As would be apparent to one skilled in the art, a snooping protocol or any other hardware-based protocol or software-based cache coherency scheme can be employed.

DSM systems such as DSM system 110 are well known. Further details of such systems may be found in, for example, Hennessy and Patterson, *Computer Architecture A Quantitative Approach,* 2d Ed. (Morgan and Kaufmann Publ.: USA 1996).

Figure 2:
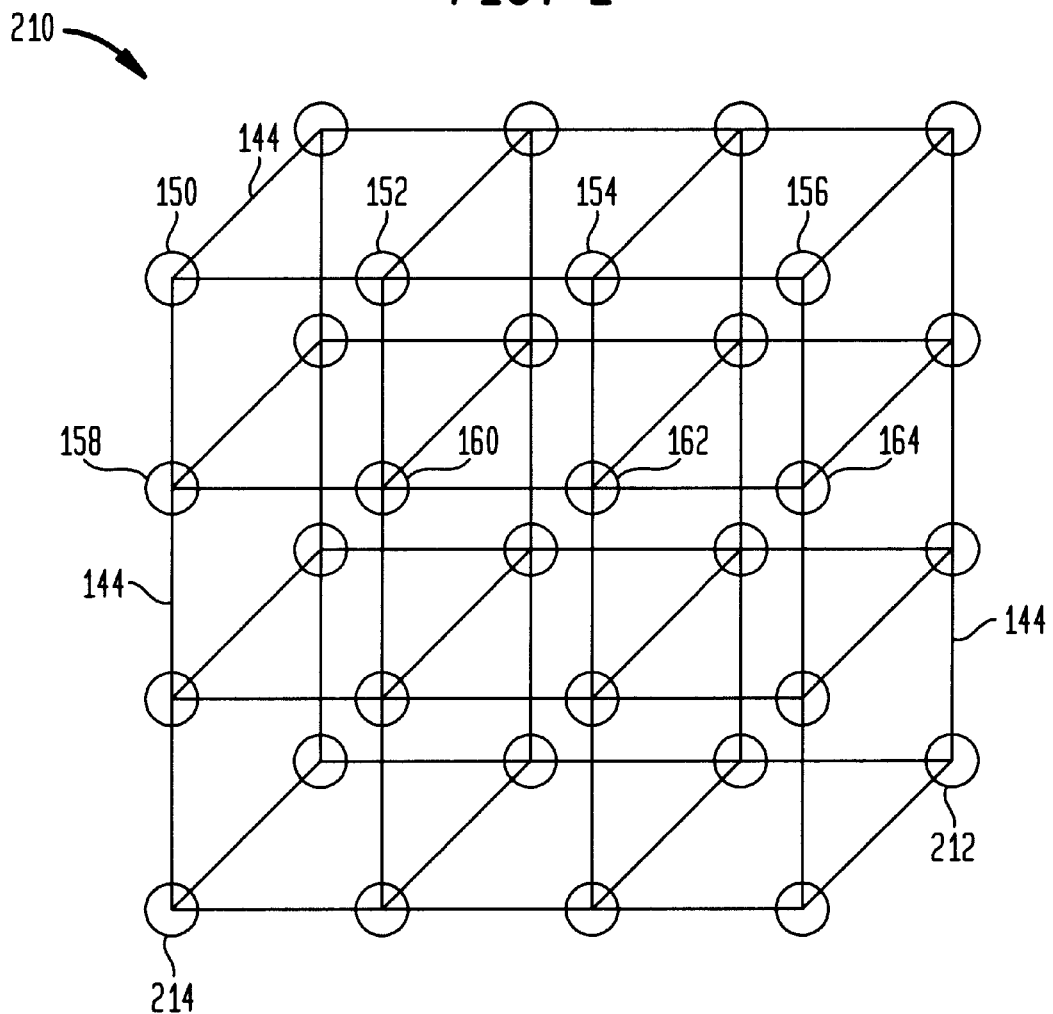
FIG. 2 is a multi-dimensional illustration of the DSM system of FIG. 1.

DSM system 110 can be arranged in a variety of multi-dimensional arrangements. For example, referring to FIG. 2, DSM system 110 forms part of a cubic DSM arrangement 210. Interconnection network 144 is represented by the solid lines between processing nodes 150–164, 212, 214, etc. Interconnection network 144 can connect any node to another node. For example, interconnection network 144 can provide a direct connection (not shown) between processing nodes 150 and 212 and between processing nodes 212 and 214. Interconnection network 144 can be any communication network having any type of topology, including, but not limited to, ring, bus, mesh and multi-stage topologies and combinations thereof.

B. Fault-Isolated DSM System Cells

Figure 3:
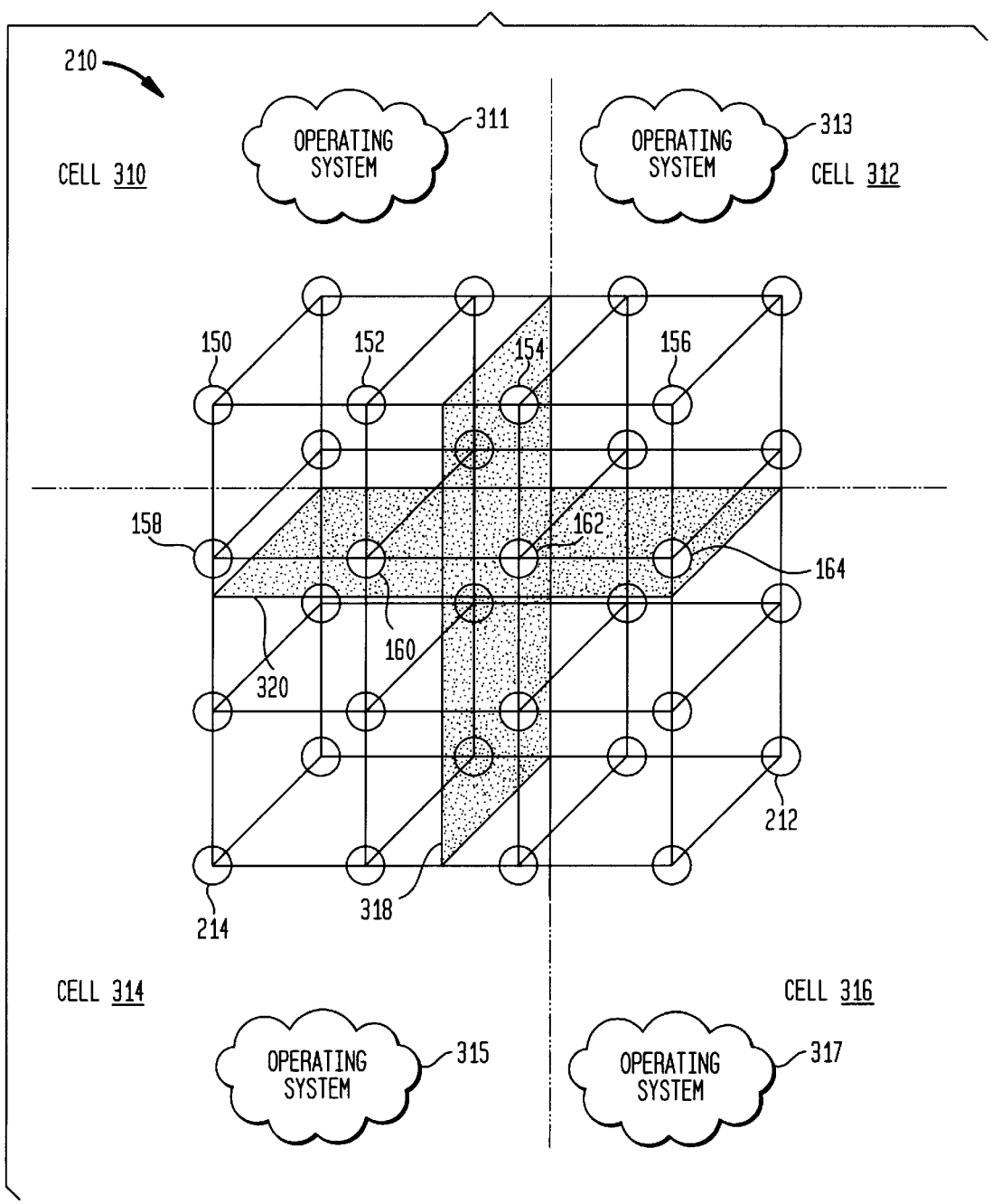
FIG. 3 is an illustration of the multi-dimensional DSM system of FIG. 2, including fault-isolating fire-walls.

DSM system processing nodes, such as processing nodes 150–164, are divided into cells in order to provide fault isolation protection. For example, referring to FIG. 3, cubic DSM system 210 is divided into four cells 310, 312, 314 and 316. Cells 310, 312, 314 and 316 are isolated from one another by fire-walls 318 and 320. Fire-walls 318 and 320 prevent processes or threads that are running on one cell from accessing portions of main memory that reside on other cells. Thus, each cell 310, 312, 314 and 316 essentially operates as an independent DSM system. Cells 310, 312, 314 and 316 are fault isolated because a fault in one cell does not affect the other cells. Fire-walls 318 and 320 can be implemented through hardware, firmware, or any combination thereof.

Fault isolated cells typically operate under control of independent operating systems. For example, cells 310, 312, 314 and 316 operate under the control of operating systems 311, 313, 315 and 317, respectively. Operating systems 311, 313, 315 and 317 can be identical copies of the same operating system or they can be different operating systems.

C. Data Structures for Representing Physical Memory and Memory Objects

Figure 4:
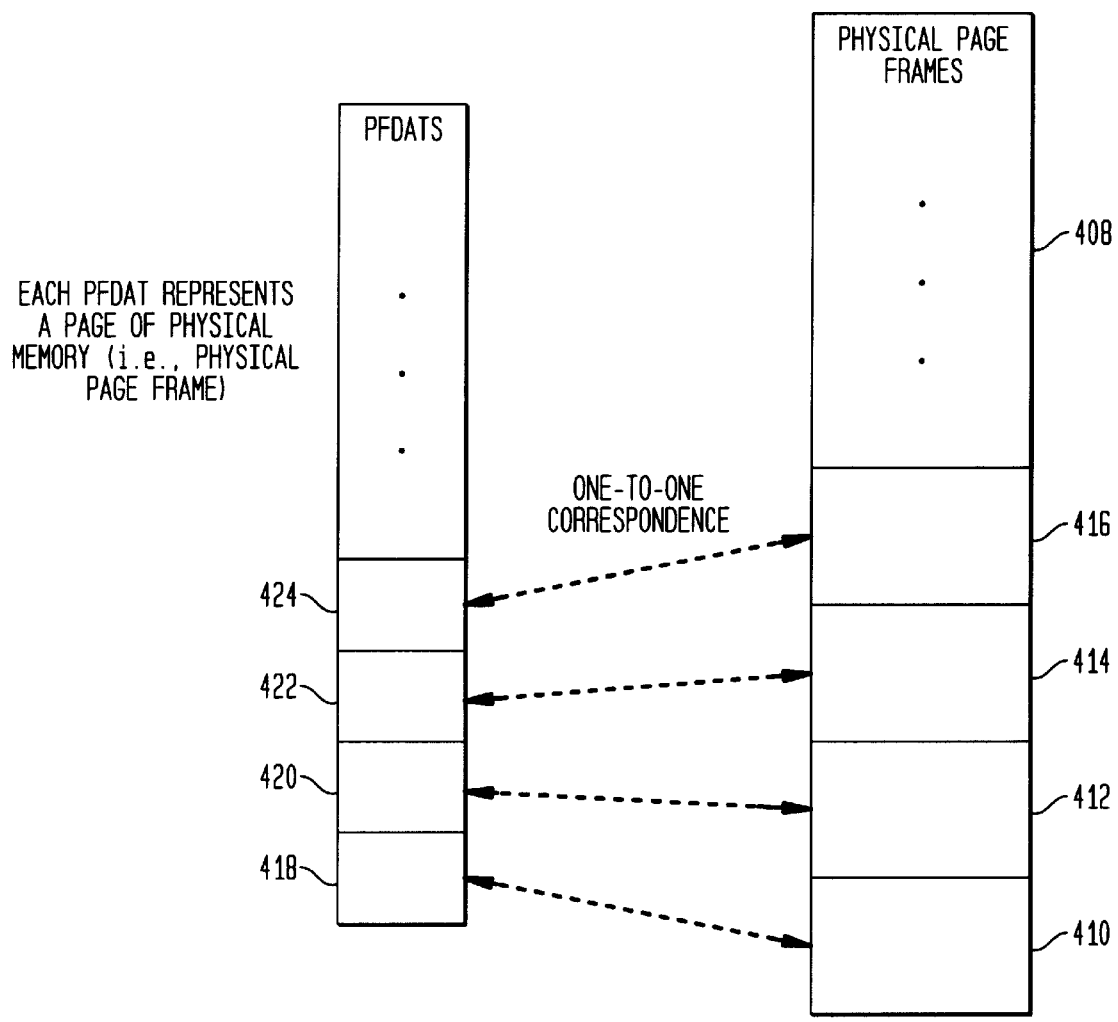
FIG. 4 is a block diagram illustrating the relationship between physical page frames and page frame data structures (PFDATs)

Conventional computer operating systems typically divide main memory, such as main memory 128–142, into pages of physical memory in order to simplify hardware design. For example, referring to FIG. 4, a physical memory 408, which can include physical memory portions 128–142, is divided into a number of physical page frames, or pages, 410–416.

Each physical page frame 410–416, is represented by a PFDAT 418–424, respectively. The operating system uses PFDATs to 418–424 store state information related to associated page frames 410–416 and to locate pages of memory objects that are stored in page frames 410–416.

Preferably, the address of the physical page that a PFDAT represents is stored implicitly by noting the relative position of the PFDAT in memory. From the relative position of the PFDAT, the physical page address can be computed. This method for identifying a physical page address is generally preferred because it saves storage overhead by not storing a pointer.

Alternatively, PFDATs 418–424 can store a pointer to a page of physical memory that the PFDAT represents. For example, referring to FIG. 5, PFDAT 418 includes a pointer 510 that points to associated page 410 of physical memory. As would be apparent to a person skilled in the art, other methods of identifying physical page addresses from PFDATs can be employed.

When a page of physical memory stores a page of a memory object, the associated PFDAT includes a reference to the memory object. Preferably, the reference includes a memory object identification and a logical offset within the memory object. The memory object identification can be a pointer to the memory object or a pointer to a data structure that represents the memory object. The logical offset identifies a portion of the memory object that is stored, relative to the beginning of the memory object.

Figure 5:
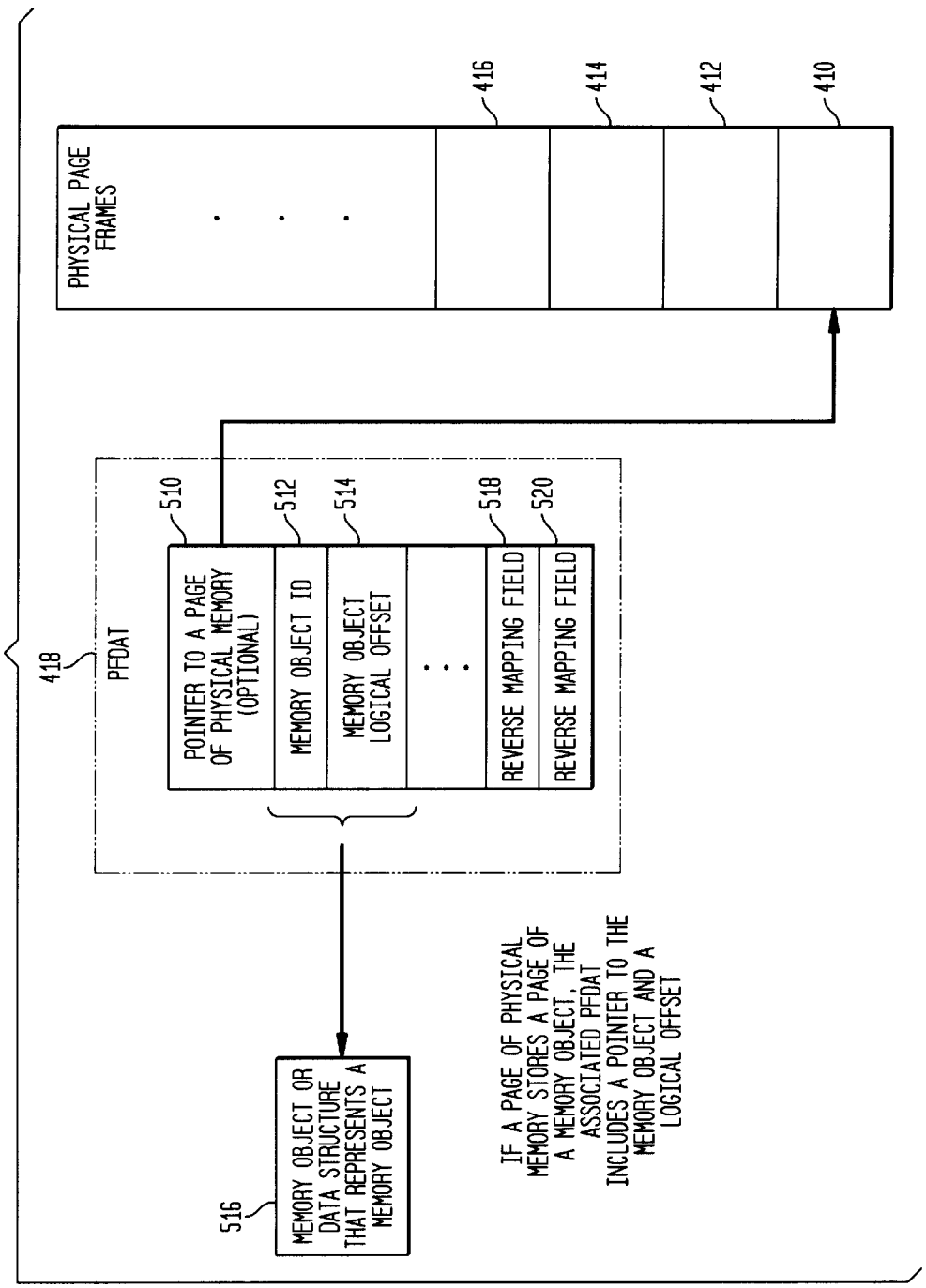
FIG. 5 is a block diagram of a page frame data structure illustrated in page 4.

For example, referring to FIG. 5, when memory 410 stores a page of a memory object, PFDAT 418 includes a pointer 512 and a logical offset 514. Pointer 512 points to a particular memory object or data structure 516 that represents the memory object. Logical offset 514 indicates a logical offset within the memory object.

Computer operating systems employ PFDATs, such as PFDATs 418–424, to store state information for pages of memory. PFDATs 418–424 can include fields for indicating, for example, whether data stored within the associated page of physical memory is clean or dirty and for indicating the current number of users of the data stored in the associated page of memory.

Computer operating systems also employ PFDATs, such as PFDATs 418–424, to determine whether, and where, pages of memory objects are stored in physical memory. The operating system can search PFDATs for memory object identifications and logical offsets. For example, when a user directs the operating system to delete a memory object, any pages in memory that are associated with the memory object must be found and de-allocated. The operating system searches PFDATs to determine whether any of them store a pointer to the memory object.

As another example, when the operating system needs to locate a page of a memory object, the operating system searches the PFDATs for the logical offset of the page. The search identifies a PFDAT if the PFDAT stores the memory object identification and logical offset that is being searched for. From the PFDAT, the physical address of the page can be determined. PFDATs can be inserted and deleted from the page cache as needed.

In order to facilitate efficient searching or translation of memory object identification and logical offsets into the corresponding PFDAT, PFDATs that are associated with memory objects are organized into a data structure, called a page cache. A page cache maps between logical offsets of memory objects and physical pages of main memory. Thus, given a memory object identification and logical offset, a page cache mapping and searching function can identify a page of physical memory which contains the data.

A page cache is generated by organizing PFDATs that are associated with memory objects (i.e., PFDATs that represent memory that stores portions of memory objects) into a searchable data structure. PFDATs can be organized in a variety of fashions, including linked lists, hash tables, tree structures, etc.

Preferably, a separate page cache of PFDATs is provided for each memory object so that each page cache associates only PFDATs that store pages of the memory object. Alternatively, a single, global page cache can be employed. Distributed page caches and global page caches are disclosed in more detail in co-pending U.S. patent application, "System, Method and Computer Program Product for Distributing Page Caches," by Curt Schimmel, application No. (to be assigned), Attorney Docket No. 15-4-465.00 (1452.2350000), filed concurrently herewith and incorporated by reference herein in its entirety.

D. Reverse Mapping

In a preferred embodiment, PFDATs, such as PFDAT 418, include one or more reverse mapping fields such as, for example, reverse mapping fields 518 and 520. Reverse mapping fields 518 and 520 store reverse mapping data that identifies data structures that reference page 410. Reverse mapping data that is stored in fields 518 and 520 is used to identify and update references to page 410 when activity occurs with respect to the data in page 410.

For example, if data in a page of physical memory is mapped into a virtual address space, a page table data structure stores a virtual memory address-to-physical memory address translation that identifies the page of memory. If the page of physical memory is page 410 and is represented by PFDAT 418, a reverse map is placed in reverse map field 518, 520 or in a reverse map table (not shown) that is pointed to by a pointer in field 518 or 520. The reverse map points to the page table entry that stores the translation. If the data that is mapped to page 410 is subsequently moved to another page of physical memory, the reverse map is used to identify the page table entry and update it with a new translation or delete the old entry.

Reverse mapping is disclosed in more detail in co-pending U.S. patent application, "System, Method and Computer Program Product for Reverse Mapping Page Frame Data Structures," by Curt Schimmel, Narayanan Ganapathy, Bhanuprakash Subramanya and Luis Stevens, application No. (To be assigned), Attorney Docket No. 15-4-472.00 (1452.2380000), filed concurrently herewith and incorporated herein in its entirety.

III. Inter-Cell Page Sharing

The present invention is a system, method and computer program product for selectively sharing memory between fault-isolated cells of a DSM system and for terminating sharing of memory in a controlled fashion. The present invention preferably includes software or firmware for controlling hardware-based fire-walls in order to control sharing of memory between cells. The software or firmware can be an integral part of operating systems 311, 313, 315 and 317. Alternatively, the software or firmware can be a separate application, a copy of which runs under each operating system 311, 313, 315 and 317, or which runs across all of operating systems 311, 313, 315 and 317.

Figure 12:
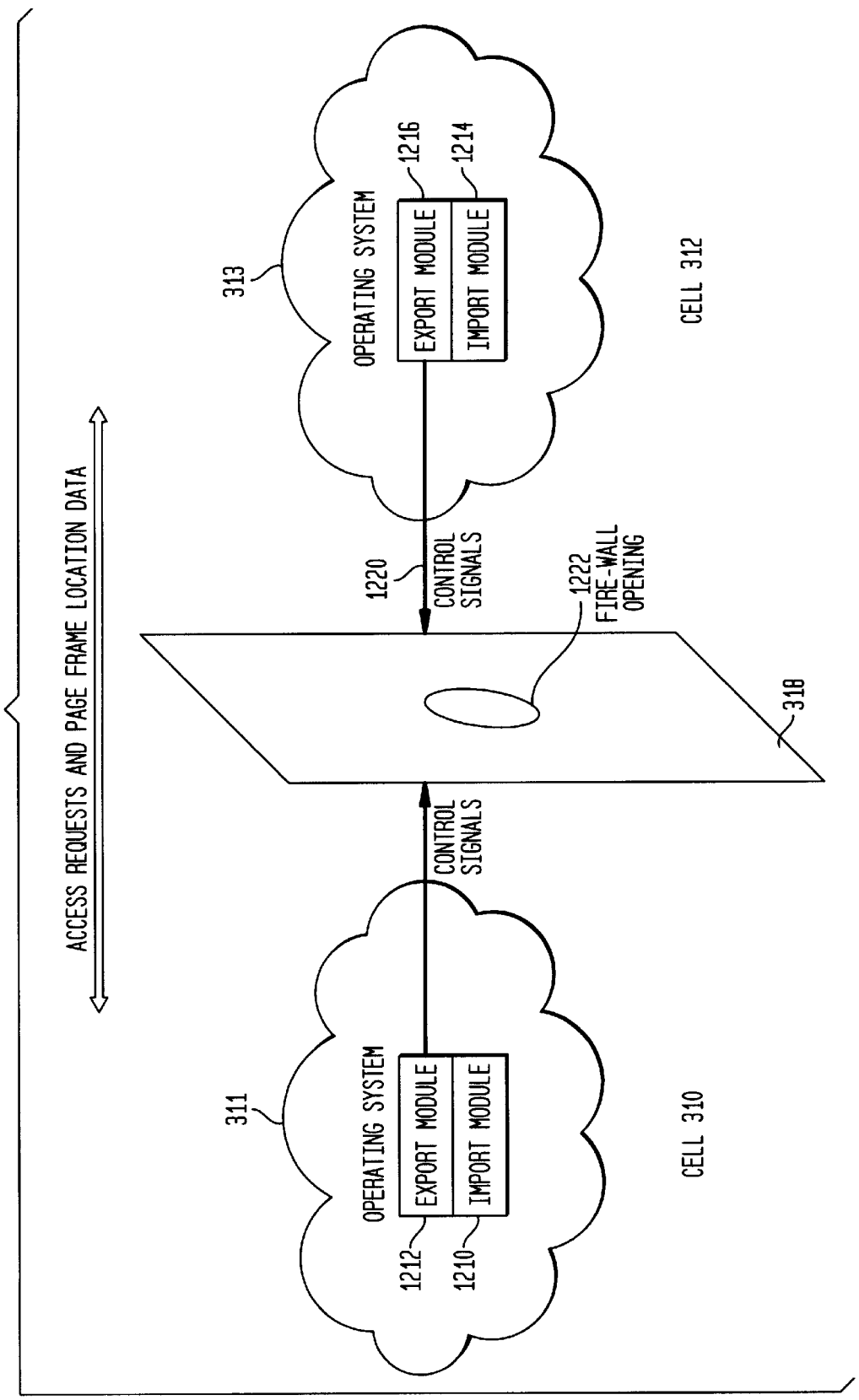
FIG. 12 is a block diagram of portions of two of the fault-isolated cells that are illustrated in FIG. 6, including an import module and export module in each cell.

Preferably, the software or firmware generates control signals to selectively open and close hardware-based fire-walls such as fire-walls 318 and 320 for specific pages of memory. For example, referring to FIG. 12, the operating system 311 includes an import module (1210) for controlling import operations to cell 310 and an export module (1212) for controlling export operations from cell 310. Similarly, operating system 313 includes an import module 1214 for controlling import operations to cell 312 and an export module 1216 for controlling export operations from cell 312. Alternatively, importing and exporting can be controlled by a single module (not shown).

Sharing includes importing and exporting selected pages of memory and controlled termination of importing and exporting. Termination can be initiated by a fault in either an exporting cell or an importing cell. Termination can also be initiated if an exporting cell requires an exported page of memory for another use or if an importing cell no longer requires the imported memory.

Figure 7:
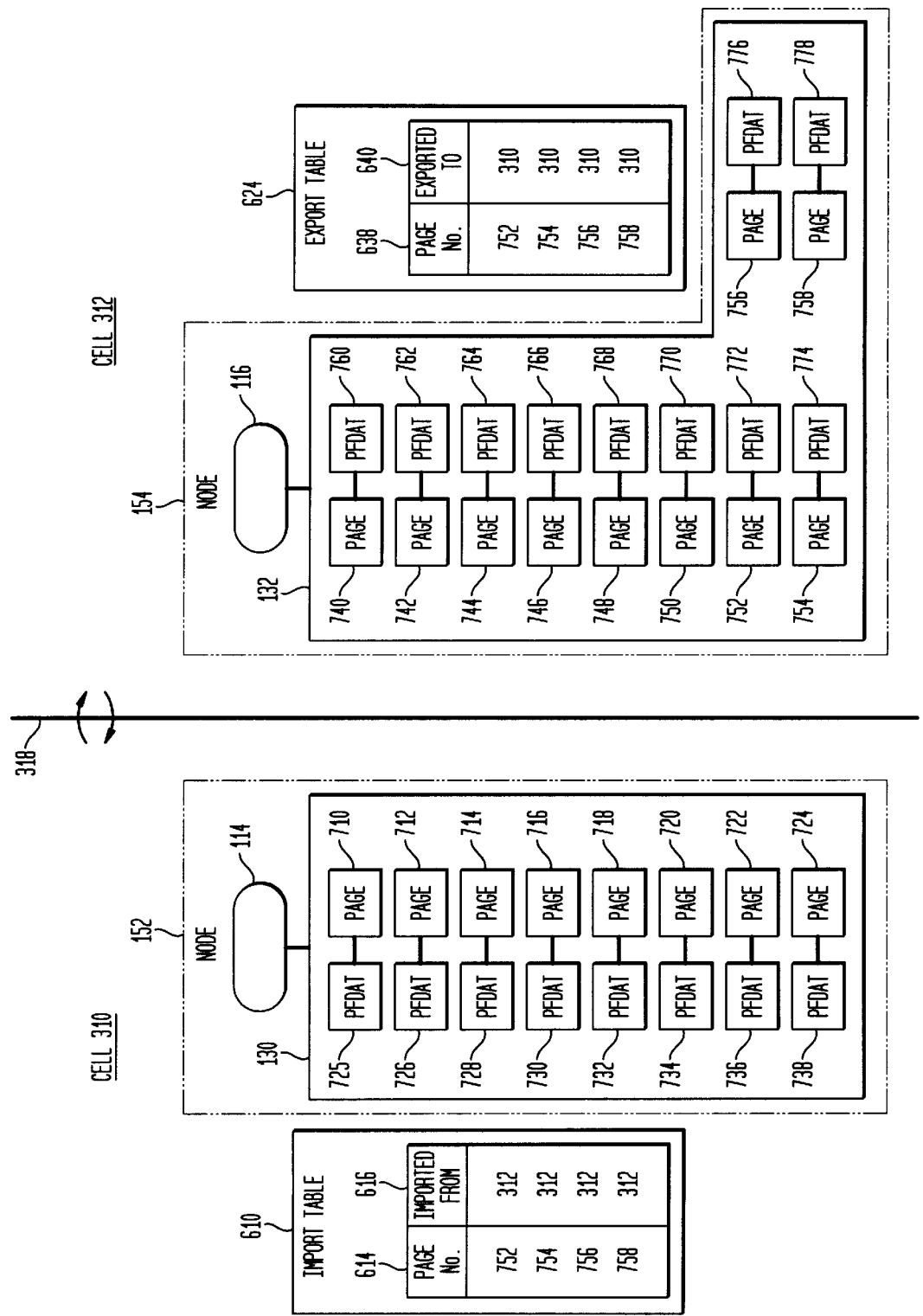
FIG. 7 is a block diagram of a portion of two of the fault-isolating cells that are illustrated in FIG. 6.

Referring to FIG. 7, the present invention is illustrated as implemented in DSM system 110. In FIG. 7, node 152 and node 154 of cells 310 and 312, respectively, are separated by fire-wall 318.

Node 152 includes main memory portion 130. Main memory portion 130 includes a number of pages of physical memory such as, for example, pages 710–724. Each page of physical memory 710–724 is represented by a page frame data structure (PFDAT) 725–738, respectively.

Node 154 includes main memory portion 132. Main memory portion 132 includes a number of pages of physical memory such as, for example, 740–758. Each page of physical memory 740–758 is represented by a PFDAT 760–778, respectively.

Each cell 310, 312, 314 and 316 stores records of imports to a cell and records of exports from the cell. An import record includes data that identifies the location of an imported page and data that identifies each cell that exported the page. An export record includes data that identifies the location of an exported page and data that identifies the cell that imported the page.

Input records and export records for a cell are preferably maintained by the kernel or operating system on the cell. Import records and export records can be maintained in a variety of ways, such as, for example, by storing import records in proxy PFDATs on importing cells and by storing export records in PFDATs on exporting cells, by storing import and export records in tables, linked lists, etc.

Figure 6:
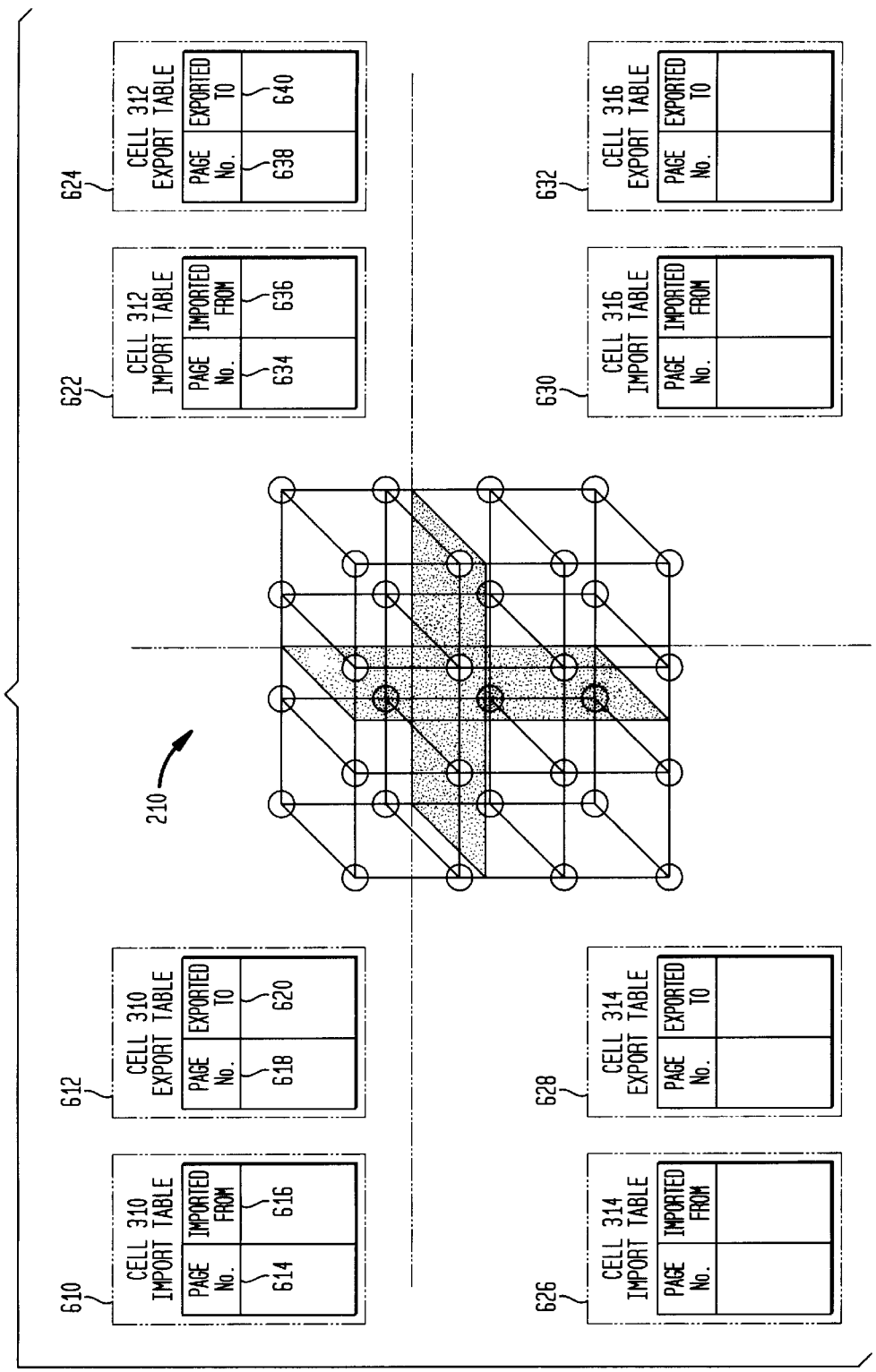
FIG. 6 illustrates the fault-isolated DSM system of FIG. 3, wherein each fault-isolated cell includes an import table and an export table according to the present invention.

For example, referring to FIG. 6, cell 310 includes an import table 610 and an export table 612. Import table 610 includes a Page Number column 614 for recording the location of imported pages of physical memory. The location of an imported page can be in the form of a physical address, a page number, etc. Import table 610 also includes an Imported From column 616 for recording identifications of cells that exported the pages listed in column 614. Cell identification data can be derived from, for example, the page number itself.

Export table 612 includes a Page number column 618 for recording addresses of exported pages of physical memory. Export table 612 also includes an Exported To column 620 for recording identifications of cells that imported the pages listed in column 618.

Similarly, cell 312 includes an import table 622 having a Page Number column 634 and an Imported From column 636. Cell 312 also includes an export table 624 having a Page Number column 638 and an Exported To column 640. Likewise, cell 314 includes an import table 626 and export table 628 and cell 316 includes an import table 630 and an export table 632.

Referring back to FIG. 7, cell 310 import table 610 indicates that pages 752–758 have been imported from cell 312 to cell 310. Similarly, cell 312 export table 624 indicates that pages 752–758 have been exported from cell 312 to cell 310. Pages 752–758 can be exported to other cells as well. Generally, exported pages 752–758 can still be accessed by cell 312. Cell 310, or any other cell, could, however, be granted exclusive rights to pages 752–758.

Figure 9:
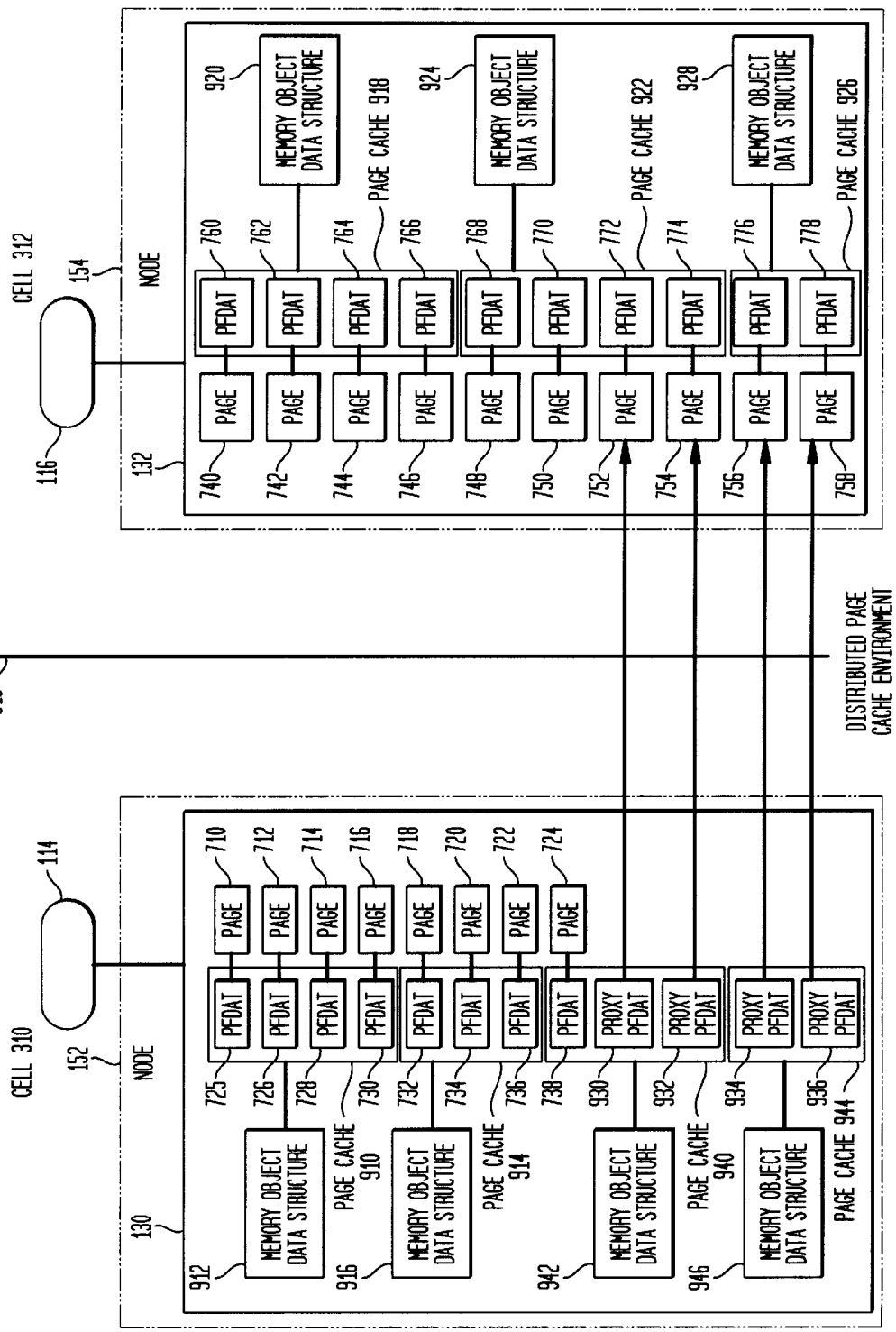
FIG. 9 is a block diagram of portions of two of the fault-isolated cells that are illustrated in FIG. 6, implemented in a distributed page cache environment.

Referring to FIG. 9, a variety of data structures are generated in exporting and importing cells so that the operating systems on those cells can maintain control over imported and exported pages of physical memory. The portions of cells 310 and 312 that are illustrated in FIG. 7 are illustrated in FIG. 9 as implemented in a distributed page cache environment.

In node 154, a page cache 918 caches PFDATs 760–766 that represent pages 740–746. Pages 740–746 store pages of a memory object that is represented by data structure 920. A page cache 922 caches PFDATs 768–774 that represent pages 748–754. Pages 748–754 store pages of a memory object that is represented by data structure 924. A page cache 926 caches PFDATs 776 and 778 that represent pages 756 and 758. Pages 756 and 758 store pages of a memory object that is represented by data structure 928.

In node 152, a page cache 910 caches PFDATs 725–730 that represent pages 710–716. Pages 710–716 store pages of a memory object that is represented by data structure 912. A page cache 914 caches PFDATs 732–736 that represent pages 718–724. Pages 718–724 store pages of a memory object that is represented by data structure 916.

Proxy PFDATs are generated in importing cells to represent imported pages of memory. Local PFDATs are maintained by exporting cells for exported pages of memory. Each cell or kernel thus maintains its own representation of imported and exported pages. Proxy PFDATs permit kernels to avoid sharing of data structures between kernels, thus maintaining fault-isolation between kernels. Proxy PFDAT looks and functions like a regular PFDAT. As a result, most of the operating system need not be aware that a page of memory is an imported page of memory.

Proxy PFDATs can store the same types of state information that are stored in conventional, or local, PFDATs. Proxy PFDATs can be used to identify the imported page of physical memory that it represents, either by their relative position, by a pointer, or by any other suitable mechanism.

In FIG. 9, proxy PFDATs 930–936 are generated by operating system 311 on cell 310 to represent imported pages of physical memory 752–758. Proxy PFDATs 930–936 can be similar to PFDATs 772–778.

Proxy PFDATs can be cached in page caches with convention, or local, PFDATs. For example, in the distributed page cache environment of FIG. 9, proxy PFDATs 930 and 932 are cached with local PFDAT 738 in a page cache 940 that is associated with memory object data structure 942. Proxy page PFDATs 934 and 936 are cached in page cache 944.

In one embodiment, when a PFDAT or a proxy PFDAT is associated with a memory object that is not present on the same cell as the PFDAT or proxy PFDAT, a proxy memory object data structure is generated in the cell to represent the memory object. Proxy memory object data structures look and function as conventional, or local, memory object data structures. The importing cell, or kernel, uses the proxy memory object data structure to represent the owning memory object just as it uses local memory object data structures.

In a distributed page cache environment, proxy memory object data structures are associated with distributed page caches. For example, in FIG. 9, if the memory object that is represented by memory object data structures 942 and 924 is present on node 154, then data structure 942 is a proxy memory object data structure. Similarly, if the memory object that is represented by memory object data structures 928 and 946 is present on a node other than nodes 152 and 154, then memory object data structures 928 and 946 are both proxy memory object data structures.

Figure 10:
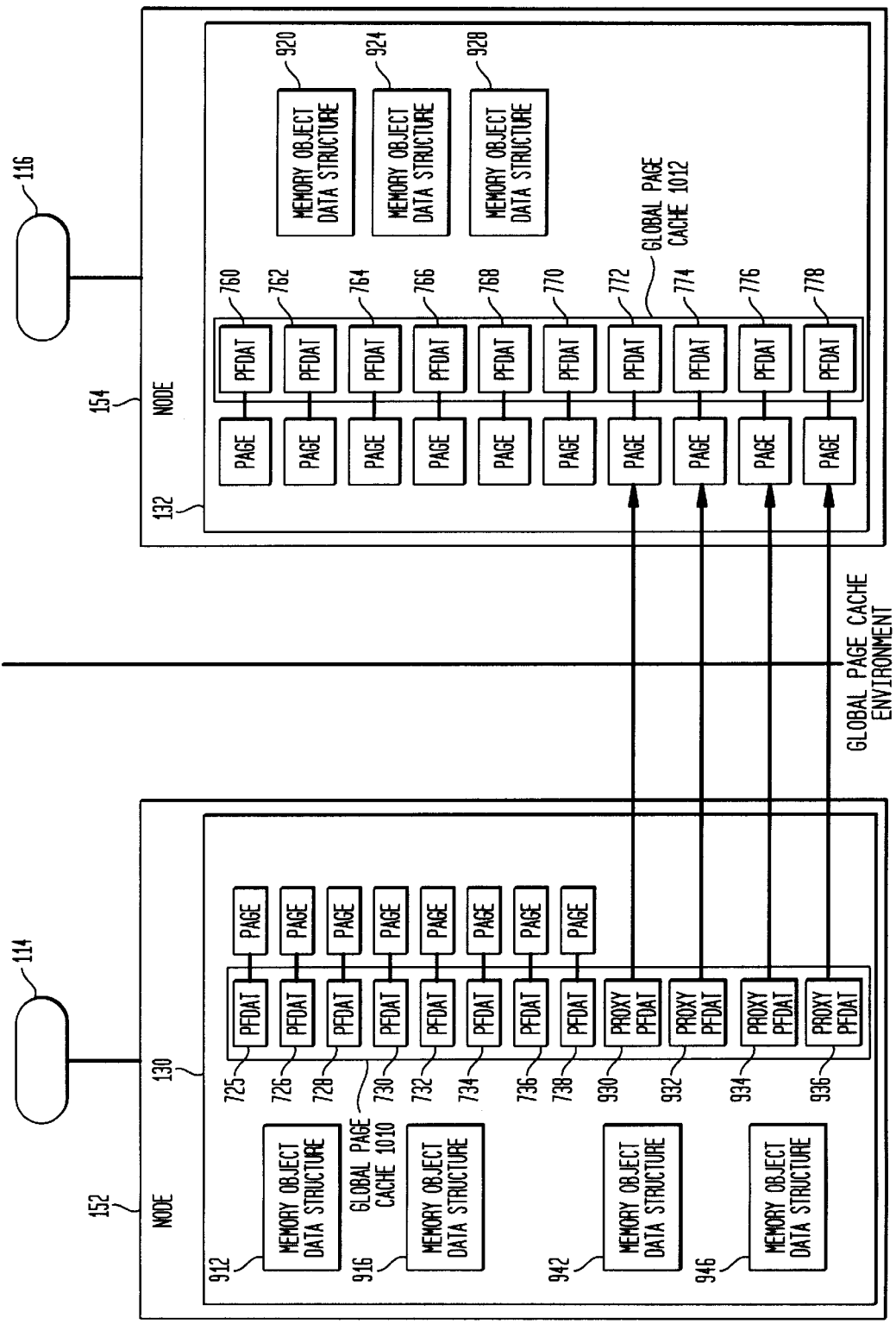
FIG. 10 is a block diagram of portions of two of the fault-isolated cells that are illustrated in FIG. 6, implemented in a global page cache environment.

In a global page cache embodiment, a global page cache holds local and proxy PFDATs for a cell. For example, referring to FIG. 10, global page cache 1010 on node 152 holds local PFDATs 725–738 and proxy PFDATs 930–936. Similarly, a global page cache 1012 on node 154 holds local PFDATs 760–778. If there were proxy PFDATs on node 154, they would be in global page cache 1012.

Figure 13:
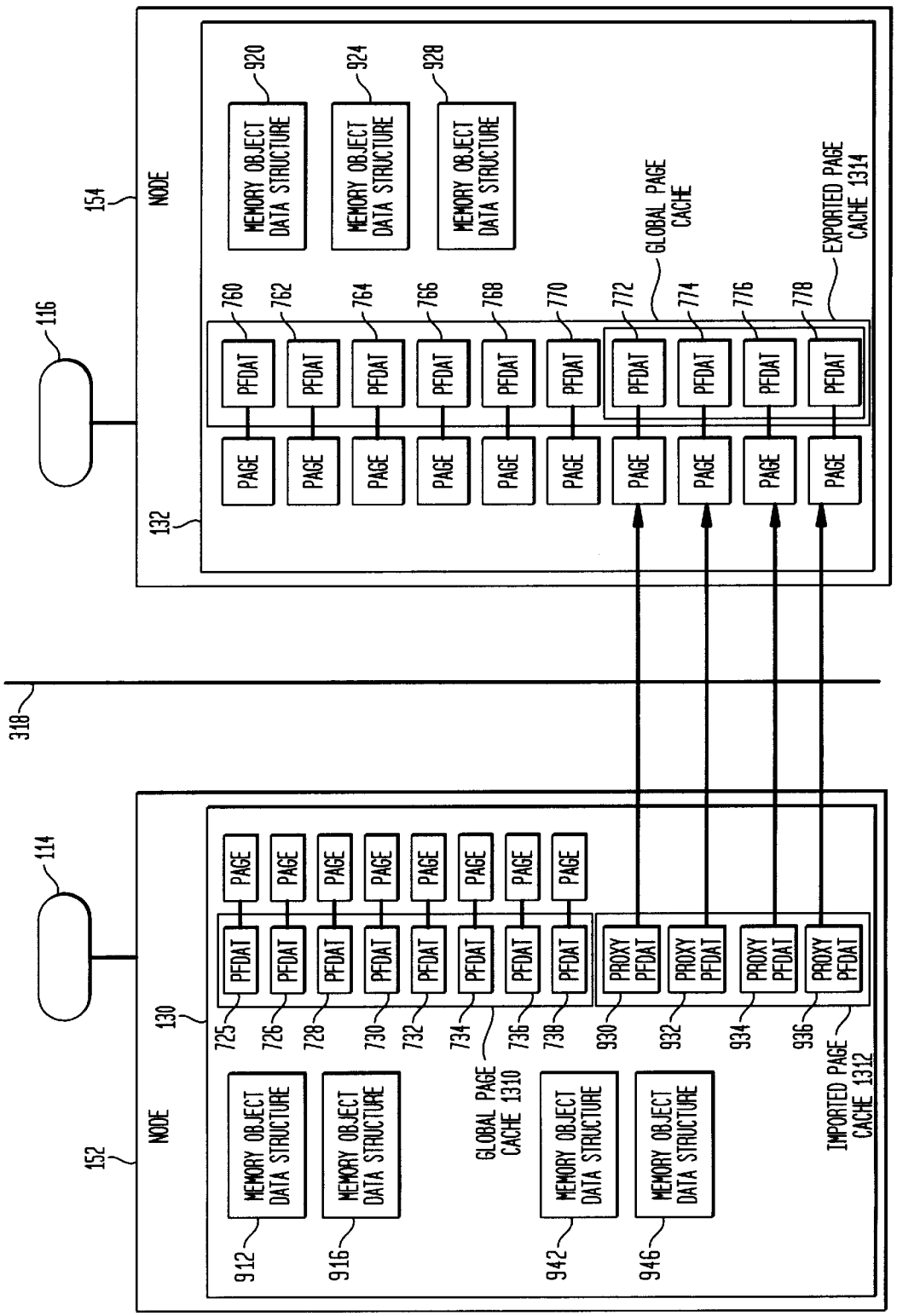
FIG. 13 is a block diagram of portions of two of the fault-isolated cells that are illustrated in FIG. 6, implemented in a global page cache environment with an imported page cache and an exported page cache.

In another embodiment, a global page cache holds local PFDATs while a separate import page cache holds proxy PFDATs. For example, referring to FIG. 13, global page cache 1310 on node 152 holds local PFDATs 725–738. Import page cache 1312 holds proxy PFDATs 930–936. In this embodiment, the import page cache can double as an import table for storing import records.

An export page cache can be generated for holding local PFDATs that represent pages of exported memory. For example, export page cache 1314 on node 154 holds PFDATs 772–778 that represent exported pages 752–758, respectively. Export page cache 1314 can be used to implement export table 624.

A. Exporting Memory

Figure 8:
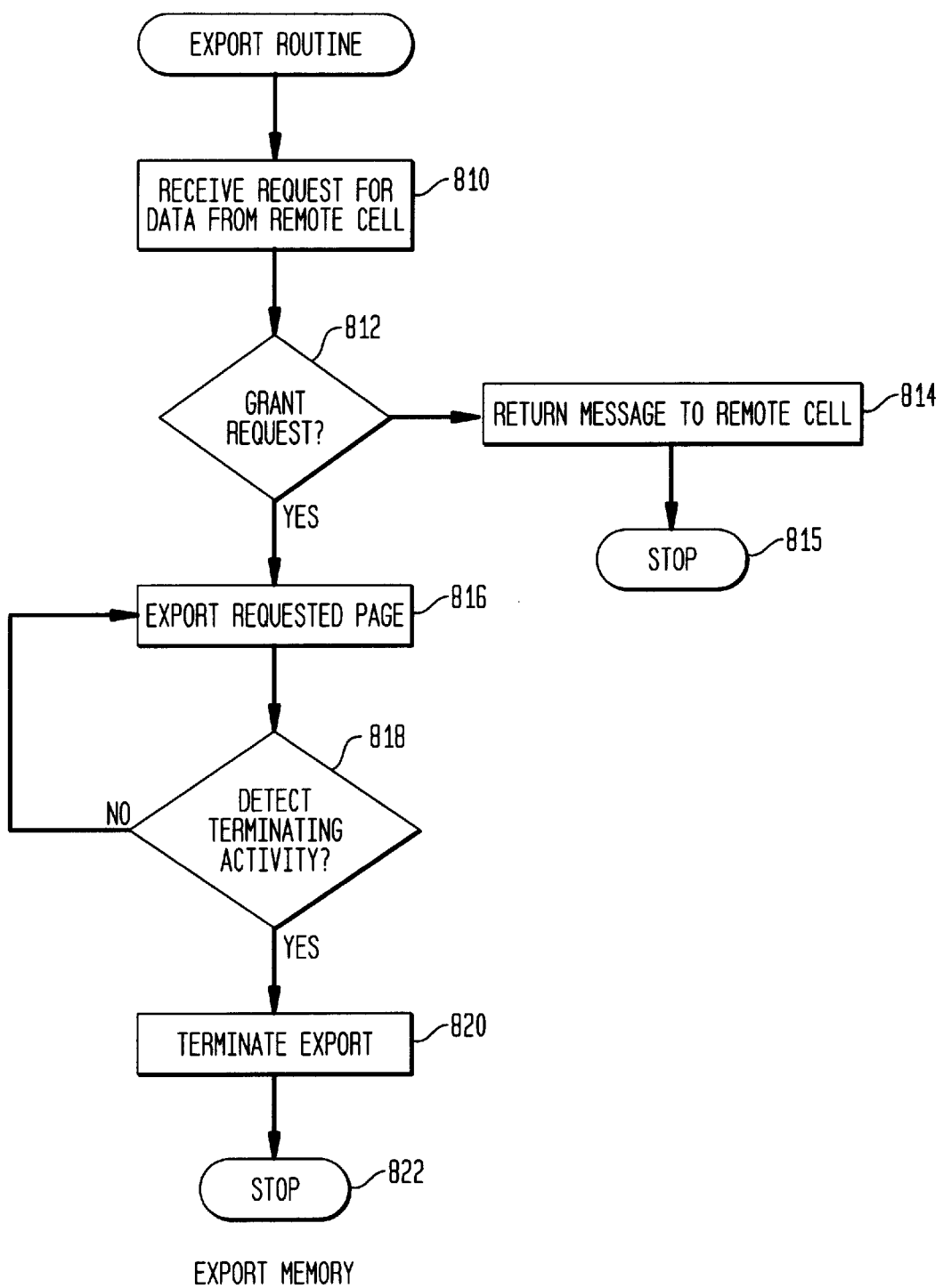
FIG. 8 is a process flowchart illustrating a method for exporting memory from a fault-isolated cell according to the present invention.

Referring to FIG. 8, a process flow chart is provided to illustrate a preferred method for exporting pages of physical memory across fire-walls in a fault isolated DSM system. The process is described with reference to DSM system 110. The process is preferably performed by an export module that is included in each cell 310, 312, 314 and 316. The export process is described from the perspective of cell 312, for an export of page 752 from cell 312 to cell 310.

The export process begins at step 810 where a request for data that is stored in page 752 is received by cell 312, from cell 310. The request can include a memory object identification and logical offset.

In step 812, cell 312 grants or denies the request. As would be apparent to a person skilled in the art given this description, access can be denied for a variety of reasons. If access is denied, the process proceeds to step 814 where the requester is notified of the denial. Processing stops at step 815.

If the request is granted in step 812, the process proceeds to step 816, where page 752 is exported from cell 312 to cell 310. Exporting can include any operation that is associated with permitting cell 310 to access page 752 in cell 310. Exporting operations are performed by export module 1215. At a minimum, exporting includes generating an opening in fire-wall 318, such as opening 1222, so that cell 310 can access page 752 in cell 312.

Selective openings in fire-wall 318 can be controlled by export records. Export records permit cells to maintain track of exported pages so that export and operations can be terminated in a controlled fashion. Export records can be maintained as a table, a linked list, as a record placed in PFDATs that represent exported pages or in any other suitable format.

For example, in FIG. 7, an export record for page 752 is placed in export table 624. The export record includes an address of exported page 752 that is placed in Page Number column 638. The export record also includes an identification of importing cell 310 that is placed in Exported To column 640. Export records can include, or can be generated from, an exported page cache.

The selective opening that is generated in step 816 only permits the importing cell to access requested page 752. Cell 312 will not permit cell 310 to access to any other page frame in cell 312 unless cell 312 includes an export record for the requestor and the requested page. Nor will cell 312 permit any other cell to access page 752 or any other page in cell 312 unless cell 312 includes an export record for the requestor and the requested page. As long as an export record for cell 310 and page 752 is maintained in cell 312, any process or thread that is executing on cell 310 can access page 752, subject to the normal restrictions placed on processes by operating system 311.

Exporting can include providing the location of page 752 to cell 310. The location of page 752 can be sent in the form of a physical address, a page number, etc. The location of page 752 can be sent from cell 312 under control of hardware, firmware or software, such as operating system 313 on cell 312, or any combination thereof.

Steps 810–816 can be performed for any number of pages in any cell that includes the export module. Thus, additional pages of physical memory can be exported as necessary. For example, export table 624 indicates that pages 754–758 are exported from cell 312 to cell 310. Although this example only illustrates pages exported from node 154 of cell 312, other nodes within cell 312 can export pages as well. Moreover, pages can be exported from nodes on cells 310, 314 and 316.

In step 818, each kernel constantly monitors for export terminating activity. So long as there is no export-terminating activity, fire-wall 318 remains open, but only for the pages and cells listed in export table 624. Export-terminating activity can be defined according to needs of users. In one embodiment, export-terminating activity includes a fatal fault in an importing cell, a decision by an exporting cell that an exported page of memory is required for some other use and non-use of an exported page by an importing cell.

If terminating activity is detected in step 818, the process proceeds to step 820 where the export is terminated. Termination can include any action necessary to limit adverse consequences to processes and threads on the exporting and importing cells. Actions can depend upon the situation that cause the termination, as described below.

At a minimum, termination of the exporting of page 752 includes closing fire-wall opening 1222 that was generated in step 816 and removing the export record for page 752 from export table 624. Fire-wall 318 can be closed by control signals 1220 sent from export module 1216. When a termination is caused by a failure in an importing cell, actions can include notifying users of page 752 that the data has possibly been corrupted by the failure in the failed importing cell. Several examples of export termination are provided below. These examples are provided to assist in the description of inter-cell page sharing according to the present invention, not to limit the present invention.

In a first export termination example, importing cell 310 suffers a fatal fault that requires resetting a portion of, or all of, cell 310. Since import records will be lost by cell 310, cell 310 will no longer know that it has rights to import any memory. Moreover, cell 310 might not initially have a need to import memory. More importantly, the failure in cell 310 might have corrupted data in one or more page of imported memory. Thus, any cell that exported memory to cell 310 needs to terminate the export and notify other users of the import page of the possible corruption of the data.

Thus, in step 818, each cell, including cell 312 receives notification of the failure in cell 310. Upon receipt of notification, each cell searches for records of exports to cell 310. For example, cell 312 searches export table 624 to determine whether cell 312 exported any memory to cell 310. In order to contain faults to cell 310, cell 312 does not have access to import records from cell 310. When cell 312 detects the export record for page 752, processing proceeds to step 820.

In step 820, the export record is removed, fire-wall 318 is closed and any other users of page 752 are notified of its possible corruption. Users can be identified, for example, by reverse map data that is stored in PFDAT 772 that represents page 752 and that is stored in cell 312. Since failed cell 310 never has access to PFDATs in cell 312, reverse map data therein is isolated from faults in cell 310.

In a second export termination example, exporting cell 312 determines to terminate the export of page 752 so that page 752 can be used for storing some other data. In step 820, cell 312 uses export table 624 to identify any cells to which page 752 has been exported. In this example, where page 752 is exported only to cell 310, notification of the impending termination is sent only to cell 310. The export record is removed from cell 312 and fire-wall 318 is closed. Preferably, cell 312 waits for permission and/or confirmation from cell 310 before terminating the export.

In a third export termination example, cell 312 receives notification from cell 310 that page 752 is no longer needed by cell 310. In step 822, cell 312 removes the export record and closes fire-wall 318.

Upon termination of the export, processing stops at step 822.

B. Importing Memory

Figure 11:
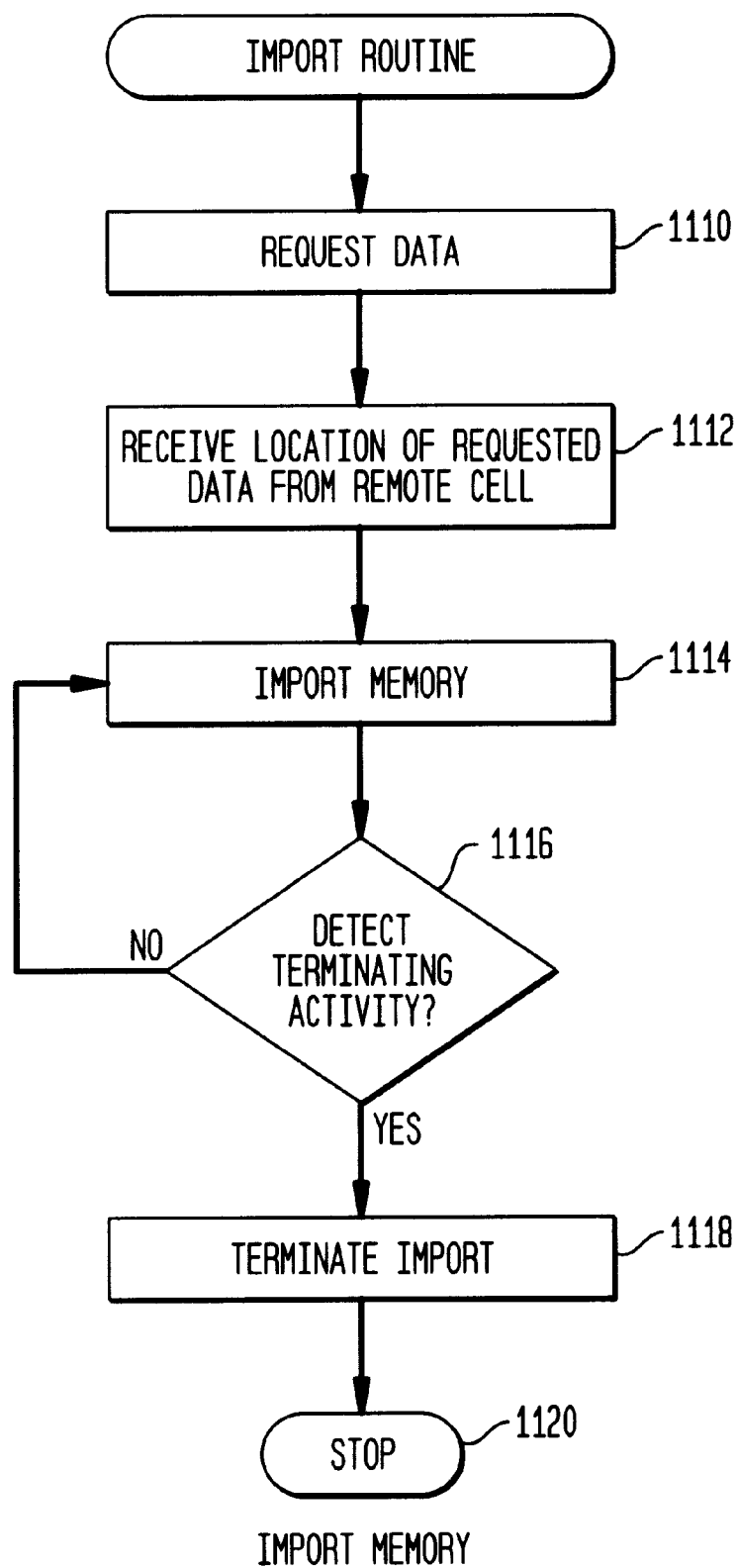
FIG. 11 is a process flowchart illustrating a method for importing memory to a fault-isolated cell, according to the present invention.

Referring to FIG. 11, a process flowchart illustrates a preferred method for importing pages of physical memory across a fire-wall of a fault-isolated DSM system. The process is described with reference to DSM system 110. The process is preferably performed by an import module that is included in each cell 310, 312, 314 and 316. The import process is described from the perspective of an import of page frame by cell 310, such as, for example, an import of page frame 752 from cell 312 to cell 310.

The import process begins at step 1110 where processor and cache node 114, in node 152, sends a request for data. The request for data can include a memory object identification and logical offset. The request can be broadcast to all cells or can initially be used only within cell 310. If cell 310 knows which cell has the data, it can sent the request to that cell alone.

If the request is initially used only within cell 310, a determination is made as to whether the requested data is stored in a portion of physical memory that is physically located within cell 310. One skilled in the are will recognize that such a determination can be performed in a variety of ways.

If the requested data is determined to be on cell 310, there is no need to initiate inter-cell page sharing. Instead, a physical address of the requested data is returned to processor and cache node 114 which can access the data contained therein at will. If the requested data is not found in cell 310, the request is sent from cell 310 to cells 312, 314 and 316 so that a similar search can be performed in those cells.

Alternatively, the initial request of step 1110 can be broadcast to all cells. After the other cells perform the search, an error is returned from each cell that fails to find the requested data.

If any of cells 312, 314 or 316 finds the requested data, the cell determines whether to grant access, according to step 812. If the cell decides to grant access, the cell exports the page frame that contains the requested data, according to step 816. For example, cell 312 determines that the data is in page frame 752 and cell 312 grants access to cell 310, then cell 312 exports page frame 752 to cell 310. The export includes sending a physical address, a page number, or some other data that identifies the location of the requested data. The export also includes opening a hole in fire-wall 318 so that cell 310 can access the data.

In step 1112, the location of the requested data is received by cell 310. The location data can be received by cell 310 under control of hardware, firmware and/or software, such as operating system on cell 310.

In step 1114, page 752 is imported by cell 310. Importing can include any operation that is associated with accessing page 752 by cell 310. At a minimum, importing includes generation of an import record in cell 310 to record the import and generation of a proxy PFDAT to store identification and state information associated with the imported page, for use by the kernel on cell 310. Proxy PFDATs can be cached in distributed page caches, such as distributed page caches 910, 914, 940 and 944. Alternatively, proxy PFDATs can be cached in a global page cache 1010 or in an imported page cache 1312.

Import records can be generated by import module 1210 of operating system 311 on cell 310. Import records can be maintained in a table, a linked list, or in any other suitable format. For example, in FIG. 7, an import record for page 752 is placed in import table 610. The import record includes an address of imported page 752 in Page Number Column 614 and an identification of exporting cell 312 in Imported From column 616. Import records permit importing cells to keep track of imported pages so that import and export operations can be terminated in a controlled fashion.

Additional pages of physical memory can be imported as necessary. Although this example only illustrates importing pages from node 154 of cell 312, other pages can be imported from other nodes within cell 312 as well. In addition, pages can be imported from nodes on other cells, such as cells 314 and 316.

In step 1116, the kernel on cell 310 constantly monitors for activity that requires termination of an import. So long as there is no import-terminating activity, cell 310 can continue to access imported pages of memory, such as page 752. Import-terminating activity can be defined according to needs of users. In one embodiment, import-terminating activity can include a fatal fault in an exporting cell, a decision by an exporting cell that an imported page of memory is required for some other uses and non-use of an imported page by an importing cell.

When import-terminating activity is detected in step 1116, the process proceeds to step 1118 where the import is terminated. Termination can include any action necessary to limit adverse consequences to processes and threads on the exporting and importing cells. Actions can depend upon the situation that cause the termination, as described below.

Import termination of page 752 includes removing import records for page 752 from import 610. When a termination is caused by a failure in an exporting cell, import-terminating actions can include notifying users of page 752 that the data has possibly been corrupted by the failure in the failed exporting cell.

Several examples of import termination are provided below. These examples are provided to assist in the description of inter-cell page sharing according to the present invention, not to limit the present invention.

In a first import termination example, in step 1116, importing cell 310 determines that it no longer needs page 752. Processing proceeds to step 1118 for termination of the import. In step 1118, cell 310 identifies exporting cell 312 from the import record and notifies exporting cell 312 of the termination. Cell 312 terminates the export by closing the opening in fire-wall 318, according to step 820. Cell 310 removes the import record from import table 610 and de-allocates the proxy PFDAT for the imported page.

In a second import termination example, exporting cell 312 experiences a fault that requires re-setting a portion of, or all of cell 312. Since data in cell 312 might be corrupted by the failure, any users of data in cell 312 must be notified and further use of data in cell 312 must be terminated. Thus, in step 1116, each cell receives notification of the failure in exporting cell 312. Upon receipt of notification, each cell searches its import records to determine whether the cell imported any page frames from the failed cell. For example, cell 310 can search import table 610 to determine whether cell 310 imported any memory from cell 312. If a cell imported a page frame from a failed cell, processing proceeds to step 1118 for termination of the import.

In step 1118, the importing cell notifies any users in the importing cell that the data is possible corrupt. In one embodiment, the proxy PFDAT that represents the imported page frame is checked for reverse map data that can identify one or more data structure references that reference the imported page frame. For example, if a page table entry references the imported page frame, the proxy PFDAT can include a reverse map that points to the page table entry. Alternatively, the proxy PFDAT can include a pointer to a reverse map table that includes a reveres map that points to the page table entry. The importing cell kernel uses the reverse map to remove the data structure reference. The importing cell also removes the record of the import.

In a third import termination example, in step 1116, cell 310 receives notification that cell 312 intends to terminate the export of page frame 752. Processing proceeds to step 1118 for termination of the import. Preferably, cell 312 waits for confirmation from cell 310 so that cell 310 can terminate the import in a controlled fashion. In one embodiment, cell 310 can preempt termination by not sending a confirmation. While cell 312 waits for confirmation from cell 310, cell 310 can notify users of the pending termination in much the same way as in the second termination example.

Upon termination of an import, processing stops at step 1120.

IV. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method for sharing memory between a first cell and a second cell of a distributed shared memory system, wherein the first cell and the second cell are separated by a fault-isolating fire-wall, comprising the steps of:

(1) receiving a request in the first cell to access a page of memory that is located in the first cell, the request having been sent by the second cell;

(2) determining in the first cell whether the second cell is permitted to access the page of memory;

(3)(a) opening a portion of the fault-isolating fire-wall between the first cell and the second cell to permit the second cell to access the page of memory, if the second cell is permitted to access the page of memory;

(3)(b) generating a record of the page of memory exported from the first cell to the second cell; and (4) closing the opened portion of the fault-isolating fire-wall.

2. The method according to claim 1, wherein step (3)(b) comprises the steps of:

(i) recording data that identifies the location of the page of memory; and (ii) recording data that identifies the second cell.

3. The method according to claim 1, wherein step (3)(b) comprises the step of:

(i) placing an export record in a page frame data structure that represents the page of memory.

4. The method according to claim 1, wherein step (3)(a) comprises the step of sending data that identifies the location of the page of memory to the second cell; and wherein step (3)(b) comprises the step of generating an export record in the first cell.

5. The method according to claim 1, wherein step (4) comprises the steps of:

(a) receiving notification in the first cell of a failure in the second cell;

(b) searching the first cell for records of exports to the second cell;

(c) finding a record of an export to the second cell;

(d) removing the record of the export to the second cell; and (e) closing fire-wall openings between the first and second cells.

6. The method according to claim 5, wherein step (4)(d) comprises the step of:

(i) notifying other processes, threads, etc., on the first cell that the page of memory is potentially corrupt.

7. The method according to claim 1, wherein step (4) comprises the steps of:

(a) determining to close the opened portion of the fault-isolating fire-wall;

(b) using a record of the export of the page of memory to identify the second cell as an importing cell;

(c) notifying the second cell that the first cell is going to terminate the exporting of the page of memory;

(d) removing the export record from the first cell; and (e) closing the opened portion of the fault-isolating fire-wall.

8. The method according to claim 7, wherein step (4)(d) comprises the step of:

(i) removing the export record from the first cell after the second cell has finished using the page of memory.

9. The method according to claim 1, wherein step (4) comprises the steps of:

(a) receiving notification from the second cell that the page of memory is no longer needed by the second cell; and (b) removing an export record for the page of memory from the first cell; and (c) closing the opened portion of the fault-isolating fire-wall.

10. A method for sharing memory between a first cell and a second cell of a distributed shared-memory system, wherein the first cell and the second cell are separated by a fault-isolating fire-wall, comprising the steps of:

(1) sending a request from the first cell to the second cell to access a page of memory that is located in the second cell;

(2) receiving the request in the second cell;

(3) determining in the second cell whether the first cell is permitted to access the page of memory;

(4) opening a portion of the fault-isolating fire-wall between the first cell and the second cell to permit the first cell to access the page of memory, if the first cell is permitted to access the page of memory;

(5) importing the page of memory from the second cell; and (6) closing the opened portion of the fault-isolating fire-wall.

11. The method according to claim 10, wherein step (5) comprises the step of:

(a) generating an import record in the first cell.

12. The method according to claim 11, wherein step (5)(a) comprises the step of:

(i) recording an address of the page of memory and an identification of the second cell.

13. The method according to claim 11, wherein step (5) further comprises the steps of:

(b) receiving data that identifies the location of the page of memory; and (c) accessing the page of memory that is located in the second cell.

14. The method according to claim 11, wherein step (5) further comprises the step of:

(b) generating a first proxy page frame data structure in the first cell for representing the page of memory.

15. The method according to claim 14, wherein step (5) further comprises the step of:

(c) associating the first proxy page frame data structure with other proxy page frame data structures in a page cache.

16. The method according to claim 14, wherein step (5) further comprises the step of:

(c) associating the first proxy page frame data structure with other proxy page frame data structures in a global page cache.

17. The method according to claim 14, wherein step (5) further comprises the step of:

(c) associating the first proxy page frame data structure with other proxy page frame data structures in an imported page cache.

18. The method according to claim 14, wherein step (5) further comprises the step of:

(c) associating the first proxy page frame data structure with other proxy page frame data structures in a page cache, wherein the first proxy page frame data structure and the other proxy page frame data structures represent pages of memory that store pages of a memory object.

19. The method according to claim 18, wherein step (5) further comprises the steps of:

(d) generating a proxy memory object data structure in the first cell for representing the memory object; and (e) associating the proxy memory object data structure with the page cache.

20. The method according to claim 11, wherein step (6) comprises the steps of:
   (a) receiving notification in the first cell of a failure in the second cell;
   (b) searching the first cell for a record of the import; and
   (c) removing the record of the import.

21. The method according to claim 11, wherein step (6) comprises the steps of:
   (a) detecting that a use indicator indicates that the first cell is no longer using the page of memory;
   (b) using the record of the import to identify the second cell as an exporter of the page of memory;
   (c) notifying the second cell that the page of memory is no longer needed;
   (d) removing the import record from the first cell; and
   (e) de-allocating the proxy page frame data structure.

22. The method according to claim 21, wherein step (6)(a) comprises the step of:
   (i) reading the use indicator from a proxy page frame data structure that represents the imported page of memory to the first cell.

23. The method according to claim 11, wherein step (6) comprises the steps of:
   (a) receiving notification in the first cell that the page of memory will no longer be available to the first cell, the notification having been sent from the second cell;
   (b) removing the import record from the first cell; and
   (c) de-allocating the proxy page frame data structure.

24. The method according to claim 11, wherein step (6) comprises the steps of:
   (a) receiving notification in the first cell that the page of memory will no longer be available to the first cell, the notification having been sent from the second cell;
   (b) notifying the second cell that the import operation is not to be terminated.

25. The method according to claim 11, wherein step (5)(a) comprises the steps of:
   (i) generating a proxy page frame data structure in the first cell for representing the page of memory; and
   (ii) reverse mapping the proxy page frame data structure to a data structure reference in the first cell that references the page of memory.

26. The method according to claim 25, wherein step (6) comprises the steps of:
   (a) identifying the data structure reference from the reverse mapping;
   (b) removing the data structure reference;
   (c) removing the import record from the first cell; and
   (d) de-allocating the proxy page frame data structure.

27. A system for sharing memory between a first and a second cell of a fault-isolated, distributed shared memory system, comprising:
   a module that exports a first page of memory from the first cell to the second cell, wherein said module that exports comprises a module that opens a portion of a fire-wall that fault-isolates the first cell from the second cell; and
   a module that imports a second page of memory to the first cell from the second cell.

28. The system according to claim 27, wherein said module that exports further comprises:
   a module that records export information in the first cell.

29. The system according to claim 27, wherein said module that imports comprises:
   a module that records import information in the first cell.

30. The system according to claim 29, wherein said module that imports further comprises:
   a module that generates a proxy page frame data structure in the first cell to represent an imported page of memory.

31. The system according to claim 30, wherein said module that imports further comprises:
   a module that places the proxy page frame data structure in a page cache.

32. The system according to claim 31, wherein said module that imports further comprises:
   a module that generates a proxy memory object data structure in the first cell to represent a memory object in another cell.

33. The system according to claim 32, wherein said module that imports further comprises:
   a module that associates the page cache with the proxy memory object data structure.

34. The system according to claim 27, further comprising:
   a module that terminates an export of the first page of memory in a controlled fashion; and
   a module that terminates an import of the second page of memory in a controlled fashion.

35. A computer program product comprising a computer useable medium having computer program logic stored therein, said computer program logic for enabling a first cell and a second cell of a fault-isolated, distributed shared memory computer system to share memory, wherein said computer program logic comprises:
   a procedure that enables the first cell of the computer to export a first page of memory from the first cell to the second cell, wherein said procedure that enables the first cell of the computer to export a first page of memory comprises a procedure that enables the first cell of the computer to open a portion of a fire-wall that fault-isolates the first cell from the second cell; and
   a procedure that enables the first cell of the computer to import a second page of memory to the first cell from the second cell.

36. The computer program product according to claim 35, wherein said procedure that enables the first cell of the computer to export a first page of memory further comprises:
   a procedure that enables the first cell of the computer to record export information in the first cell.

37. The computer program product according to claim 35, wherein said procedure that enables the first cell of the computer to import a second page of memory for importing comprises:
   a procedure that enables the first cell of the computer to record import information in the first cell.

38. The computer program product according to claim 37, wherein said procedure that enables the first cell of the computer to import a second page of memory further comprises:
   a procedure that enables the first cell of the computer to generate a proxy page frame data structure in the first cell to represent an imported page of memory.

39. The computer program product according to claim 38, wherein said procedure that enables the first cell of the computer to import a second page of memory further comprises:
   a procedure that enables the first cell of the computer to place the proxy page frame data structure in a page cache.

40. The computer program product according to claim 39, wherein said procedure that enables the first cell of the computer to import a second page of memory further comprises:

a procedure that enables the first cell of the computer to generate a proxy memory object data structure in the first cell to represent a memory object in another cell.

41. The computer program product according to claim 40, wherein said procedure that enables the first cell of the computer to import a second page of memory further comprises:

a procedure that enables the first cell of the computer to associate the page cache with the proxy memory object data structure.

42. The computer program product according to claim 35, further comprising:

a procedure that enables the first cell of the computer to terminate an export of the first page of memory in a controlled fashion; and a procedure that enables the first cell of the computer to terminate an import of the second page of memory in a controlled fashion.

43. A system for sharing memory between a first and a second cell of a fault-isolated, distributed shared memory system, comprising:

means for exporting a first page of memory from the first cell to the second cell, wherein said means for exporting comprises means for opening a portion of a firewall that fault-isolates the first cell from the second cell; and means for importing a second page of memory to the first cell from the second cell.

* * * * *